(12) United States Patent
Nishiyama et al.

(10) Patent No.: US 8,186,158 B2
(45) Date of Patent: May 29, 2012

(54) VARIABLE TURBO SUPERCHARGER AND METHOD OF DRIVING THE SAME

(75) Inventors: Toshihiko Nishiyama, Oyama (JP); Shuuji Hori, Oyama (JP); Takahisa Iino, Oyama (JP); Daisuke Kozuka, Oyama (JP)

(73) Assignee: Komatsu Ltd., Tokyo (JP)

( * ) Notice: Subject to any disclaimer, the term of this patent is extended or adjusted under 35 U.S.C. 154(b) by 479 days.

(21) Appl. No.: 12/443,159

(22) PCT Filed: Sep. 26, 2007

(86) PCT No.: PCT/JP2007/068652
§ 371 (c)(1),
(2), (4) Date: Apr. 22, 2009

(87) PCT Pub. No.: WO2008/041576
PCT Pub. Date: Apr. 10, 2008

(65) Prior Publication Data
US 2010/0024415 A1    Feb. 4, 2010

(30) Foreign Application Priority Data
Sep. 29, 2006    (JP) .................... 2006-268778

(51) Int. Cl.
*F02D 23/00*    (2006.01)
(52) U.S. Cl. .......... 60/602; 60/605.1; 60/605.2; 60/608; 137/625.63; 137/625.66; 415/111; 415/112; 415/157; 415/158
(58) Field of Classification Search .................. 60/602, 60/605.1, 605.2, 608; 137/625.63, 625.66; 415/111, 112, 157, 158
See application file for complete search history.

(56) References Cited

U.S. PATENT DOCUMENTS

| | | | |
|---|---|---|---|
| 2,355,434 A | * | 8/1944 | Harter .................. 137/625.63 |
| 4,804,316 A | | 2/1989 | Fleury |
| 5,713,204 A | * | 2/1998 | Kadlicko ..................... 60/608 |
| 5,868,552 A | * | 2/1999 | McKean et al. ............ 415/158 |
| 5,941,684 A | * | 8/1999 | Parker ....................... 415/156 |
| 6,105,616 A | | 8/2000 | Sturman et al. |
| 6,203,272 B1 | | 3/2001 | Walsham |

(Continued)

FOREIGN PATENT DOCUMENTS

GB    2 326 198 A1    12/1998

(Continued)

OTHER PUBLICATIONS

English Language International Search Report dated Jan. 15, 2008 issued in parent Appln. No. PCT/JP2007/068652.

(Continued)

*Primary Examiner* — John K Kim
(74) *Attorney, Agent, or Firm* — Holtz, Holtz, Goodman & Chick, PC

(57) ABSTRACT

A hydraulic servo drive device for driving a slide mechanism of a variable geometry turbocharger includes a servo piston connected to a driveshaft of the slide mechanism and a pilot spool that is accommodated in a center hole of the servo piton and slides by pilot pressure. A first hydraulic chamber and a second hydraulic chamber to and from which pressure oil flows are provided in a housing. The servo piston separately includes a pressure port for introducing pressure oil from an outside, a first piston port for intercommunicating the center hole and the first hydraulic chamber, a second piston port for intercommunicating the center hole and the second hydraulic chamber, and a return port for exiting pressure oil.

8 Claims, 9 Drawing Sheets

U.S. PATENT DOCUMENTS

| | | | |
|---|---|---|---|
| 6,257,508 B1 * | 7/2001 | Wieczorek et al. | 239/533.8 |
| 6,269,642 B1 * | 8/2001 | Arnold et al. | 60/602 |
| 6,679,057 B2 | 1/2004 | Arnold | |
| 6,736,595 B2 * | 5/2004 | Jinnai et al. | 415/164 |
| 6,776,574 B1 | 8/2004 | Parker | |
| 7,000,392 B2 * | 2/2006 | Greentree | 60/602 |
| 8,021,106 B2 * | 9/2011 | Battig | 415/160 |
| 8,079,217 B2 * | 12/2011 | Li et al. | 60/602 |
| 2006/0130914 A1 | 6/2006 | Barber | |
| 2007/0172348 A1 * | 7/2007 | Battig | 415/160 |
| 2010/0024415 A1 * | 2/2010 | Nishiyama et al. | 60/602 |
| 2010/0054909 A1 | 3/2010 | Nishiyama et al. | |

FOREIGN PATENT DOCUMENTS

| | | |
|---|---|---|
| JP | 57-134401 U | 8/1982 |
| JP | 63-83407 A | 4/1988 |
| JP | 6-58158 A | 3/1994 |
| JP | 11-72008 A | 3/1999 |
| JP | 11-343857 A | 12/1999 |
| JP | 2003-527522 A | 9/2003 |
| JP | 2004-084545 A | 3/2004 |
| WO | WO 01/69045 A1 | 9/2001 |
| WO | WO 2008/041577 A1 | 4/2008 |

OTHER PUBLICATIONS

T. Nishiyama, "Variable Turbo Supercharger and Method of Driving the Same", U.S. Appl. No. 12/443,167, filed Mar. 26, 2009.

English language International Preliminary Report on Patentability and Written Opinion of the International Searching Authority dated Apr. 22, 2009, issued in counterpart International Application Serial No. PCT/JP2007/068652.

English Office Action dated Sep. 22, 2010 (in English) issued in counterpart English Application No. GB 0906585.5.

* cited by examiner

VARIABLE TURBO SUPERCHARGER AND METHOD OF DRIVING THE SAME

This application is a U.S. National Phase Application under 35 USC 371 of International Application PCT/JP2007/068652 filed Sep. 26, 2007.

TECHNICAL FIELD

The present invention relates to a variable geometry turbocharger and a driving method thereof.

BACKGROUND ART

Conventionally, a variable geometry turbocharger in which a nozzle for injecting exhaust gas to an exhaust turbine is structured by a pair of exhaust inlet walls facing each other, one of the pair of exhaust inlet walls advancing toward and retreating away from the other to allow adjustment of a gap between the exhaust inlet walls (i.e., opening area of the nozzle), is known. With the variable geometry turbocharger, at a low speed revolution zone of an engine having a small displacement, the gap between the exhaust inlet walls is reduced to increase a flow speed of exhaust gas flowing into the exhaust turbine, thereby increasing the rotary energy of a turbine wheel to enhance supercharging performance of a charging compressor.

A sliding mechanism having a plurality of links is employed for advancing and retreating the exhaust inlet wall, and the slide mechanism is driven by a pneumatic actuator (e.g., Patent Document 1). Here, the pneumatic actuator is typically structured by a cylinder and a piston that slides within the cylinder, and the piston is slid in a first direction by air pressure of a compressed air and in a second direction by a coil spring biasing the piston theretoward. When the piston is slid in the second direction, supply of the air pressure is interrupted.

Also, employment of a hydraulic servo actuator of the four port type instead of the pneumatic actuator is proposed (e.g., Patent Document 2). According to Patent Document 2, though different from aforementioned Patent Document 1 in the mechanism for achieving a variable opening area of the nozzle, a more precise control of an opening degree can be achieved by driving the variable geometry mechanism by the hydraulic servo actuator. The hydraulic servo actuator switches the supply of the pressure oil to the hydraulic chambers on both sides of the servo piston by a proportional solenoid valve. In other words, a position of a spool forming the solenoid valve is switched to switch the supply of hydraulic pressure to the hydraulic chambers.
Patent Document 1: JP-A-11-72008
Patent Document 2: JP-T-2003-527522

DISCLOSURE OF THE INVENTION

Problems to be Solved by the Invention

However, according to Patent Document 1, since the piston is reciprocated by different means, i.e., the air pressure and the spring force, a movement of the piston in the first direction is different from a movement of the piston in the second direction, thereby causing difference in movements of the exhaust inlet wall. As a result, hysteresis is increased, making it difficult to precisely control the opening degree of the nozzle. In addition, because a load at the time of sliding the exhaust inlet wall is directly applied on the piston according to the structure, a load drift may be caused depending on largeness of the load, which also hampers precise control of the opening degree. In short, the technique disclosed in Patent Document 1 is an open control technique of the so-called coil balance method, which is not favorable in terms of the hysteresis characteristics and the load drift characteristics.

On the other hand, according to Patent Document 2, the characteristics can be improved by using a hydraulic servo actuator of the four port type. However, according to a structure which switches supply of pressure oil to each hydraulic chamber by a spool of a solenoid valve as disclosed in Patent Document 2: the spool moves in accordance with a balance between a solenoid thrust of the solenoid valve and a spring force of a spring provided within the solenoid valve; a hydraulic circuit opens as a result of the movement of the spool to move a servo piston; a pinion meshing with a rack integrally provided to the servo piston rotates; and an eccentric cam integrated with the pinion rotates to actuate the nozzle opening degree adjustment mechanism. Thus, with this structure, although the spool for controlling the position takes a balance between the solenoid thrust and the spring load, a large amount of pressure oil for driving the servo piston flows through the spool and the spring load is not large enough, so that movement of the spool is likely to be affected by a flow force, thereby limiting preciseness of the spool position control. Incidentally, if the solenoid thrust is increased to increase the spring load, size of the solenoid is increased and a larger space is necessary for the solenoid.

An object of the invention is to provide a variable geometry turbocharger capable of precise control with control characteristics such as the hysteresis characteristic and the load drift characteristic being enhanced and improving reliability, and a driving method of such a variable geometry turbocharger.

Means for Solving the Problems

A variable geometry turbocharger according to an aspect of the invention is a variable turbocharger including: exhaust inlet walls provided at a nozzle at an outer side of a turbine wheel and facing each other; a plurality of nozzle vanes disposed between the exhaust inlet walls with a predetermined interval along a circumferential direction of the turbine wheel; a slide mechanism that advances and retreats one of the exhaust inlet walls in a facing direction relative to the other of the exhaust inlet walls; and a hydraulic servo drive device that drives the slide mechanism, in which the hydraulic servo drive device includes a housing that has an opening at a portion thereof, a servo piston slidably housed in the housing and connected to the slide mechanism via the opening, and a pilot spool that is housed in a center hole of the servo piston and slides by pilot pressure, the housing includes a first hydraulic chamber at a first end of the servo piston and a second hydraulic chamber at a second end of the servo piston, pressure oil being flown in and flown out the first hydraulic chamber and the second hydraulic chamber, the servo piston separately includes a pressure port for introducing the pressure oil from an outside into the center hole, a first piston port for intercommunicating the center hole and the first hydraulic chamber, a second piston port for intercommunicating the center hole and the second hydraulic chamber, and a return port for flowing out the pressure oil of the first and second hydraulic chambers to the outside, and the pilot spool includes a switch that switches an intercommunicating state of the ports.

Incidentally, the switch provided to the pilot spool may be, e.g., a spool land of a pilot spool.

A driving method of a variable geometry turbocharger according to another aspect of the invention is a driving method of the above-mentioned variable geometry turbocharger, the method including: communicating the pressure port with the first piston port and the second piston port with the return port by sliding the pilot spool in a first direction due to increase in pilot pressure, and accordingly making the servo piston follow the sliding of the pilot spool in the first direction; communicating the pressure port with the second piston port and the first piston port with the return port by sliding of the pilot spool in a second direction due to decrease in the pilot pressure, and accordingly making the servo piston follow the sliding of the pilot spool in the second direction; and advancing and retreating the one of the exhaust inlet walls by driving the slide mechanism with sliding of the servo piston.

With the aspects of the invention, because the servo piston and the pilot spool can actualize a hydraulic servo drive device of the four port type, the advancement and retreat of the first exhaust inlet wall can be conducted with a small hysteresis, and the drive load at the time of advancement and retreat is not transmitted to the pilot pool, thus preventing load drift. Accordingly, the control characteristics such as the hysteresis characteristic and the load drift characteristic can be improved, and the opening degree of the nozzle can be controlled with accuracy. In addition, the pilot spool, which functions as the spool of the solenoid valve of Patent Document 2, is operated not by the hydraulic pressure for driving the servo piston but by the pilot pressure independent of this hydraulic pressure. Thus, the pilot spool is prevented from being influenced by flow force, so that the position of the pilot spool can be controlled with more preciseness, thus achieving even more precise control of the opening degree.

Further, because the pilot spool slides within the servo piston, the hydraulic servo drive device can be downsized to prevent enlargement of the variable geometry turbocharger, so that the variable geometry turbocharger can be favorably disposed within a narrow engine room.

In the above arrangement, it is preferable that a pilot hydraulic chamber is provided adjacent to the first end of the servo piston in the housing and partitioned from the first hydraulic chamber by a partition, and the pilot hydraulic chamber is displaced outward in an axial direction of the housing relative to the first hydraulic chamber.

In the above arrangement, it is also preferable that a pilot hydraulic chamber is provided adjacent to the first end of the servo piston in the housing and partitioned from the first hydraulic chamber by a partition, and the pilot hydraulic chamber is displaced inward in a radial direction of the housing relative to the first hydraulic chamber.

With these arrangements, when the pilot hydraulic chamber is provided outwardly in the axial direction of the first hydraulic chamber, radial enlargement of the hydraulic servo drive device can be prevented, and in contrast, when the pilot hydraulic chamber is positioned at a radially inner side of the housing relative to the first hydraulic chamber, the pilot hydraulic chamber and the first hydraulic chamber are radially overlapped to prevent axial enlargement.

In the above arrangement, it is preferable that the servo piston includes a connecting section for connection with the slide mechanism at a position displaced in an axial direction relative to the pressure port.

The pressure port is a portion through which the pressure oil for moving the servo piston passes in a highly pressurized state, so that a shape around the pressure port is likely to influence the movement of the servo piston. Thus, in the aspect of the invention, the connecting section with the slide mechanism is provided at a position apart from the pressure port, so that the shape around the pressure port can be formed to take a favorable hydraulic balance without being affected by the shape of the connecting section, thereby achieving a smooth movement of the servo piston.

In the above arrangement, it is preferable that the slide mechanism includes a converter that converts rotary movement of a rotatable driveshaft into advancing and retreating movement of the one of the exhaust inlet walls, and the driveshaft and the servo piston are connected via a second converter that converts the advancing and retreating movement of the servo piston into rotary movement of the driveshaft.

With this arrangement, a linear movement of the servo piston can be converted into a rotary movement by the converters and again into a linear movement, thus reliably advancing and retreating the exhaust inlet wall.

In the above arrangement, it is preferable that the second converter includes a slide groove formed perpendicular to the axial direction on an outer circumference of the servo piston, a slider that slidably engages in the slide groove, and an arm having a first end rotatably engaged to the slider and a second end connected to the driveshaft.

With this arrangement, the converter, being formed by the slide groove, the slider, and the arm, can be arranged in a simple structure.

In the above arrangement, it is preferable that at least one of the first and second hydraulic chambers is provided with a coil spring that biases the servo piston to one of moving directions of the servo piston.

With this arrangement, because the movement of the servo piston in the first direction is assisted by the coil spring, even when, for some reason, the pressure oil in the piping connected to the hydraulic servo drive device is lost, the spring force of the coil spring can keep the opening degree of the nozzle of the variable geometry turbocharger in a predetermined state.

In the above arrangement, it is preferable that oil for driving the hydraulic servo drive device is lubricating oil of an engine in which the variable geometry turbocharger is installed.

With this arrangement, the oil from the oil pan can be supplied to the hydraulic servo drive device by partly improving the lubrication circuit of the engine, so that the circuit arrangement can be simplified without providing a brand-new hydraulic circuit.

In the above arrangement, it is preferable that the lubricating oil is pressurized and supplied to the hydraulic servo drive device.

With this arrangement, the servo piston of the hydraulic servo drive device can be operated with high hydraulic pressure, so that the slide mechanism can be driven reliably and speedily.

BEST MODE FOR CARRYING OUT THE INVENTION

An embodiment of the invention will be described below with reference to the drawings.

Figure 1:
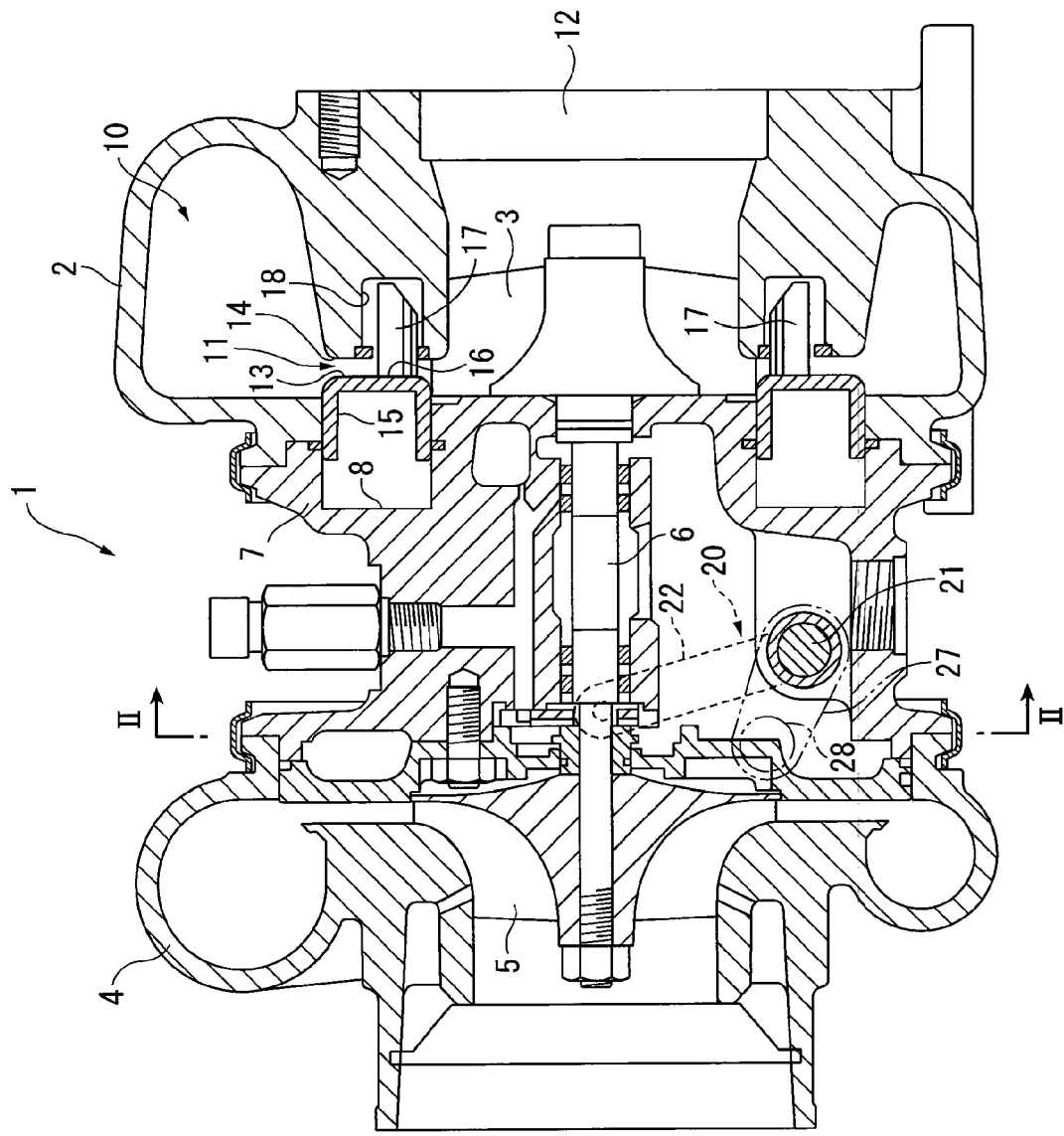
FIG. 1 is a cross-sectional view showing a variable geometry turbocharger according to an embodiment of the invention.

FIG. 1 is a cross-sectional view showing a variable geometry turbocharger 1 according to the embodiment. The variable geometry turbocharger 1 includes a turbine in a right side of FIG. 1 and a compressor in a left side of FIG. 1 and is provided to an engine body (not shown). A turbine wheel 3 is housed in a turbine housing 2 adjacent to the turbine, and a compressor impeller 5 is housed in a compressor housing 4 adjacent to the compressor. A shaft 6 is integrally provided to the turbine wheel 3, and the compressor impeller 5 is attached to an end of the shaft 6. The shaft 6 is rotatably supported by a center housing 7. With this arrangement, the turbine wheel 3 rotated by exhaust gas transmits its rotation to the compressor impeller 5 via the shaft 6, and rotation of the compressor impeller 5 compresses and charges intake gas.

The turbine housing 2 is provided with a volute-shaped exhaust inlet path 10 for introducing exhaust gas from the engine body. The exhaust inlet path 10 is circumferentially provided continuously with a nozzle 11 for injecting the exhaust gas toward the turbine wheel 3, and the exhaust gas injected from the nozzle 11 rotates the turbine wheel 3 before exhausted from an exhaust exit 12. The nozzle 11 is formed by a pair of exhaust inlet walls 13 and 14 that face each other.

One exhaust inlet wall 13 is formed by a lateral side 16 of an annular movable ring 15 having a C-shaped cross section. The movable ring 15 is housed in an annular housing space 8 provided to the center housing 7. A plurality of nozzle vanes 17 that project toward the other exhaust inlet wall 14 are attached on the lateral side 16 of the movable ring 15 with equal circumferential intervals. A circumferentially continuous recess 18 is formed on the exhaust inlet wall 14, and an end of each nozzle vane 17 is housed within the recess 18. With this structure, when the movable ring 15 is advanced and retreated by a slide mechanism 20 described below, the exhaust inlet wall 13 is moved toward and away from the exhaust inlet wall 14 to change the opening area of the nozzle 11.

Incidentally, because an arrangement of the compressor, which is the same as that of a typical turbocharger, is known, a detailed description thereof will be omitted. The slide mechanism 20 will be described in detail below.

Figure 2:
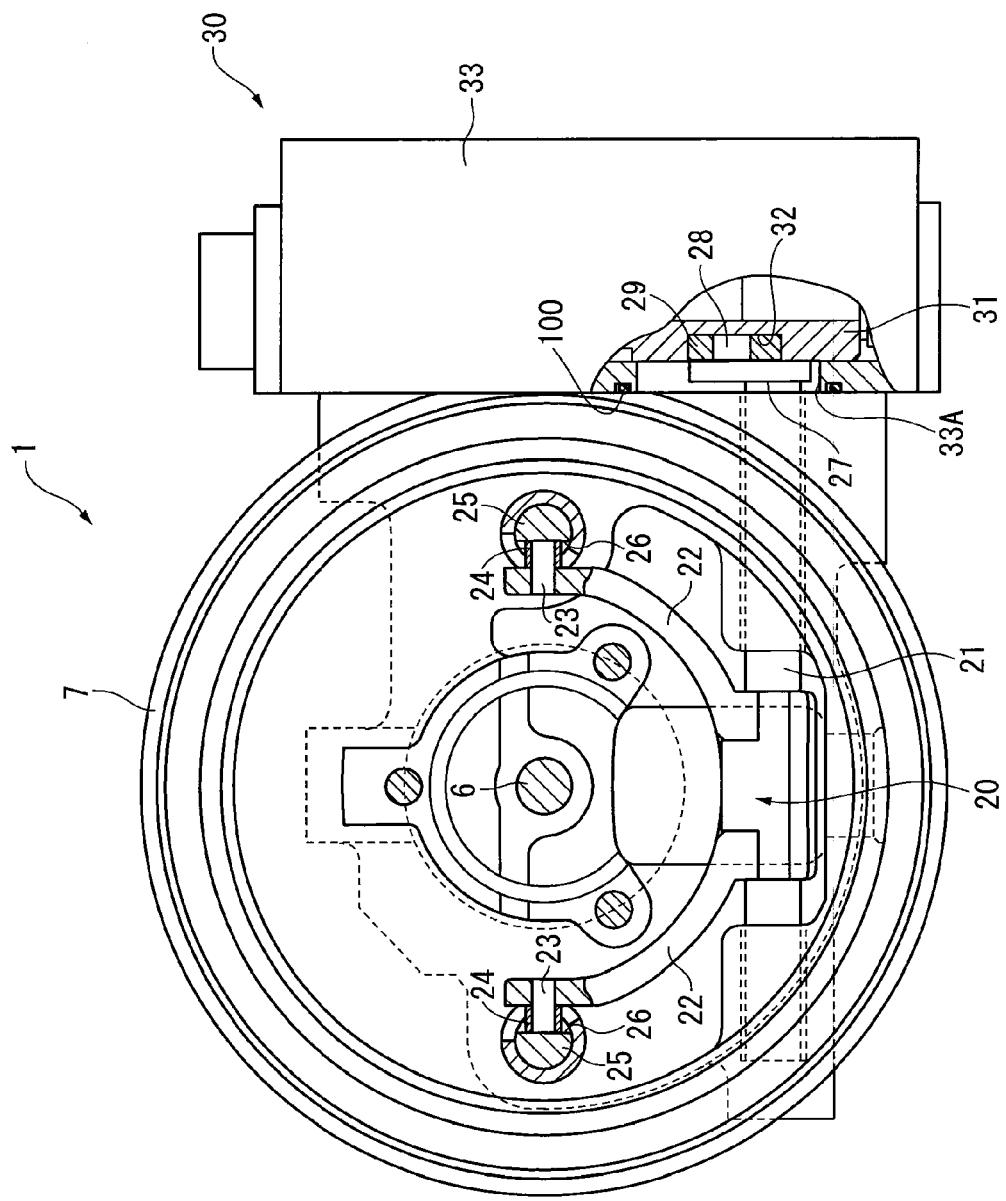
FIG. 2, which shows a slide mechanism of the variable geometry turbocharger, is a view on arrow II-II of FIG. 1.
Figure 3:
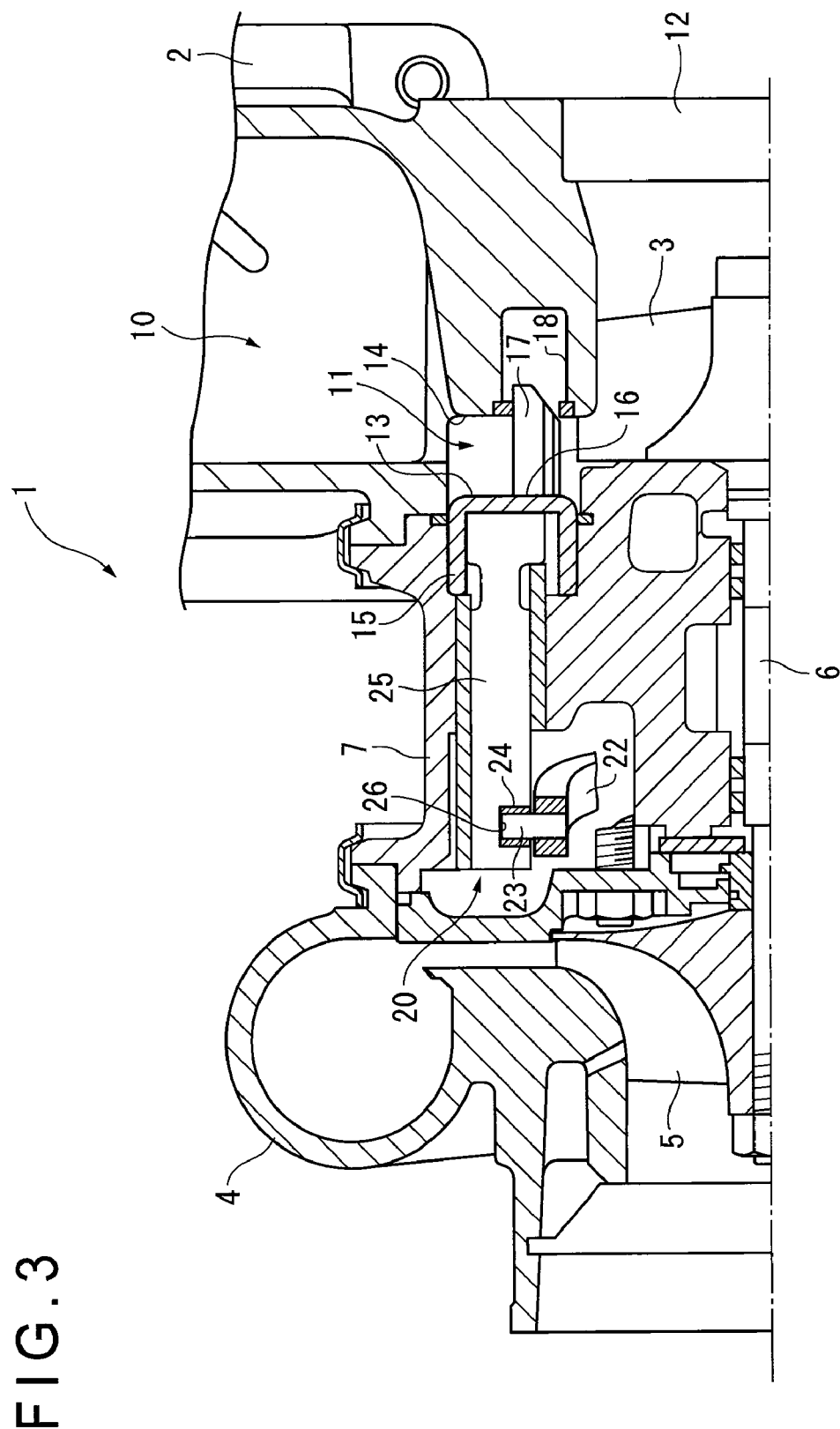
FIG. 3 is a cross-sectional view showing a primary portion of the slide mechanism.

The slide mechanism 20 has a structure in which a driveshaft 21 inserted through a lower side of the center housing 7 is rotated to advance and retreat the above-noted movable ring 15. FIGS. 2 and 3 show a primary portion of the slide mechanism 20. In FIGS. 2 and 3, a pair of arc-shaped arms 22, 22 extending upward are fixed at intermediate positions of the driveshaft 21. A pin 23 projecting horizontally outward is attached to an end of each arm 22, and a slider 24 is fitted in the pin. The slider 24 is slidably fitted with a slide groove 26 adjacent to a base end of a support rod 25 parallel to the shaft 6. A distal end of the support rod 25 is abutted to a rear side of the movable ring 15.

With the above arrangement, when the driveshaft 21 is rotated, the arm 22 swings along an axial direction of the shaft 6, so that the support rod 25 is moved to move the movable ring 15, thus advancing and retreating the first exhaust inlet wall 13 relative to the second exhaust inlet wall 14. In the slide mechanism 20, the support rod 25 having the arm 22, the pin 23, the slider 24, and the slide groove 26 forms a converter that converts rotary movement of the driveshaft 21 to advancing and retreating movement of the exhaust inlet wall 13.

The driveshaft 21 of the slide mechanism 20 is rotated by a hydraulic servo drive device 30 via an arm 27 provided on an end of the driveshaft 21. The hydraulic servo drive device 30 will be described in detail below.

Figure 4:
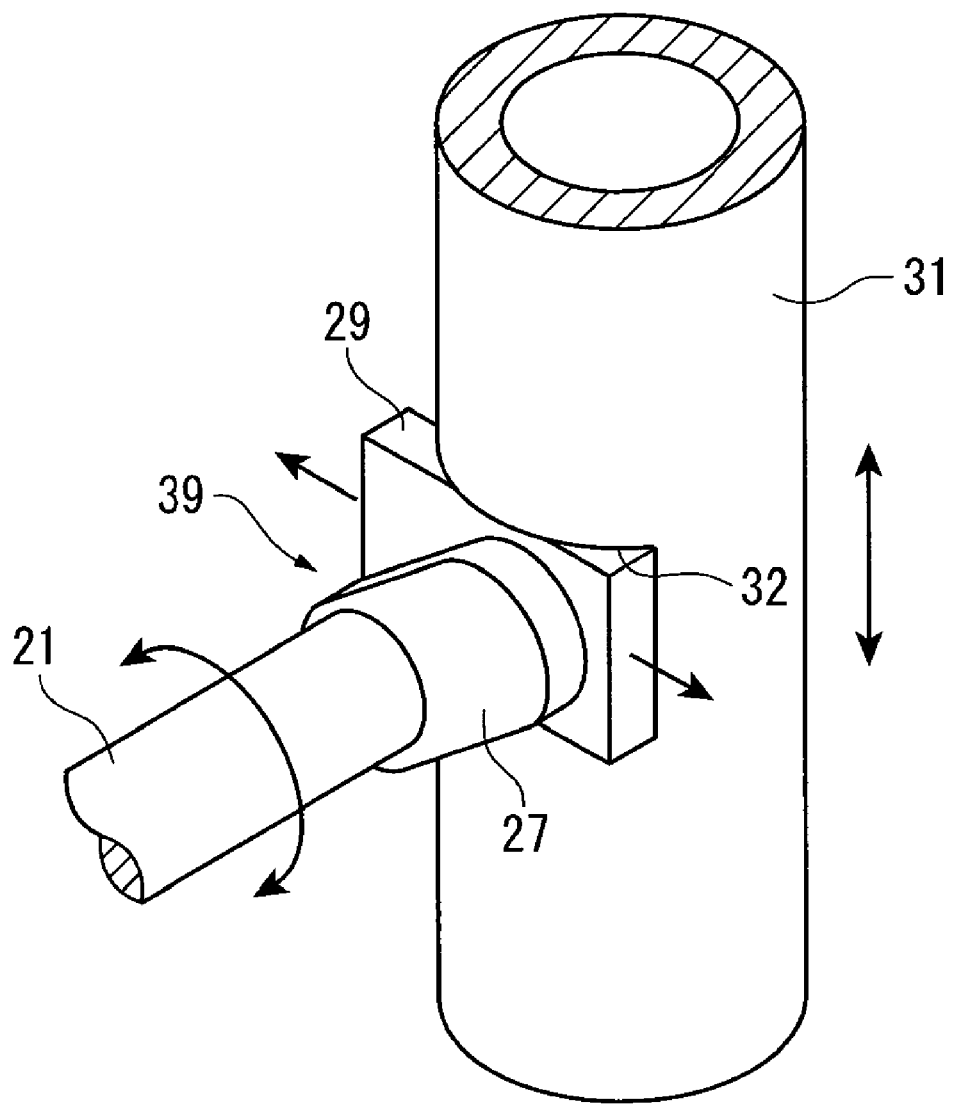
FIG. 4 is a perspective view showing a connecting section of the slide mechanism and a hydraulic servo drive device.

As shown in FIG. 4, a basic structure of the hydraulic servo drive device 30 is rotating the driveshaft 21 as result of vertical reciprocation of a servo piston 31. Thus, a slide groove 32 perpendicular to an axial direction is provided on an outer circumference of the servo piston 31; a pin 28 projecting toward the slide groove 32 is provided on the arm 27 adjacent to the driveshaft 21; a slider 29 is fitted in the pin 28; and the slider 29 is slidably fitted with the slide groove 32.

In other words, in the embodiment, another converter, which includes the slide groove 32, the slider 29, the pin 28, and the arm 27, is provided for converting the reciprocating movement of the servo piston 31 into the rotary movement of the driveshaft 21. With the vertical movement of the servo piston 31, the slider 29 moves up and down and slides along the slide groove 32, and the movement of the slider 29 and the rotation of the pin 28 allow an arc movement of the arm 27 to rotate the arm 27.

Figure 5:
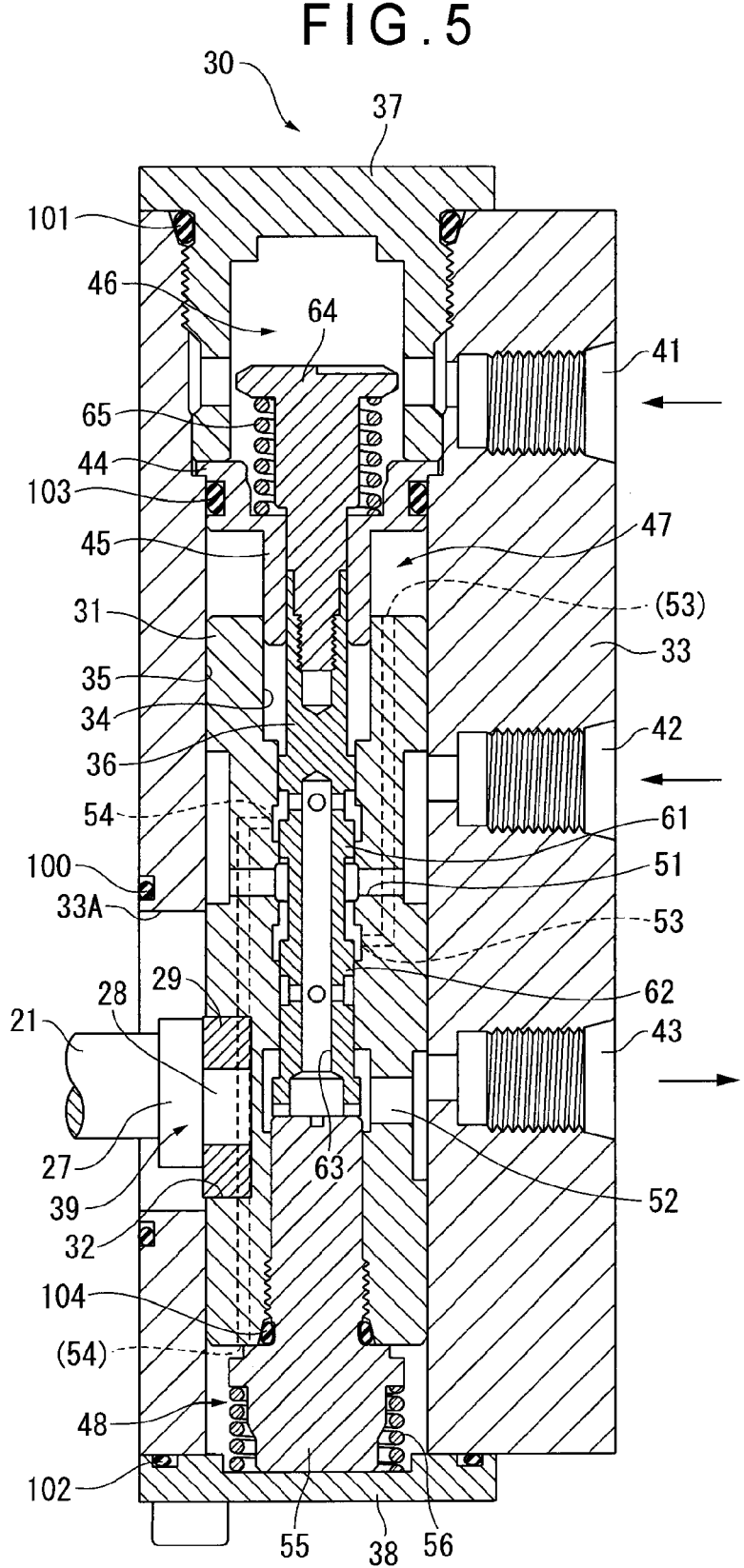
FIG. 5 is a cross-sectional view showing the hydraulic servo drive device.

FIG. 5 shows a vertical cross section of the hydraulic servo drive device 30. In FIG. 5, the hydraulic servo drive device 30 includes: the servo piston 31; a housing 33 which slidably houses this servo piston 31 and a portion of which forms an opening 33A; and a pilot spool 36 which is housed in a center hole 34 axially penetrating the servo piston 31 and slides by pilot pressure. The hydraulic servo drive device 30 is mounted in the center housing 7 of the variable geometry turbocharger 1 via an O-ring 100 that seals a surrounding of the opening 33A.

The housing 33, which has a prismatic external shape, contains a vertically penetrating cylindrical cylinder space 35 in inside thereof, and the servo piston 31 is housed in the cylinder space 35. Upper and lower ends of the cylinder space 35 are hermetically covered by covers 37 and 38 via the O-rings 101 and 102. A connecting section 39 of the driveshaft 21 and the servo piston 31 is formed at a position adjacent to the opening 33A of the housing 33. Thus, the size of the opening 33A is determined in consideration of sliding amount of the servo piston 31 and the slider 29.

A side of the housing 33 remote from the opening 33A includes: a pilot port 41 for supplying pilot pressure from, e.g., a proportional solenoid valve 95 (FIG. 8) positioned apart from the variable geometry turbocharger 1; a pump port 42 for supplying pressure oil from a pressure elevation pump 92 (FIG. 8); and a drain port 43 for returning the pressure oil. The pressure elevation pump 92 and the proportional solenoid valve 95 are installed in the same engine body (not shown) as the one in which the variable geometry turbocharger 1 of the embodiment is installed. Because the proportional solenoid valve 95 is provided to the engine body independently of the housing 33, the housing 33 can be downsized, so that the variable geometry turbocharger 1 itself can be downsized to save space. Such a space saving advantage is important for a construction machine or the like that has an extraordinarily small engine room unlike a transport truck or the like.

The cylinder space 35 of the housing 33 is partitioned by a partition 44 into a portion where the servo piston 31 slides and a portion thereabove. The partition 44 abuts to a stepped portion formed on an inner circumference of the cylinder space 35, and an O-ring 103 for sealing the space partitioned by the partition 44 is provided in the vicinity of the abutting portion. The partition 44 is provided with a tubular portion 45 extending downward, and the tubular portion 45 is inserted in an upper side of the center hole 34 of the servo piston 31. The upper one of the spaces partitioned by the partition 44 forms a pilot hydraulic chamber 46, which is communicated with the pilot port 41.

On the other hand, the lower one of the spaces partitioned by the partition 44 forms a first hydraulic chamber 47 which is defined by the partition 44 and an upper end of the servo piston 31. In other words, the pilot hydraulic chamber 46 is displaced axially outward (upward in the embodiment), thereby preventing enlargement of the hydraulic servo drive device 30 as a whole. In addition, a second hydraulic chamber 48 is formed between a lower end of the servo piston 31 and the lower cover 38.

Next, the servo piston 31 will be described. The servo piston 31 is provided with a pressure port 51 for intercommunicating the center hole 34 and the pump port 42 of the housing 33 and for delivering the pressure oil from the pump into the center hole 34. Outer sides of the pressure port 51 are opened grooves in formed radially opposing to each other, and since the grooves have a predetermined vertical dimension, the pressure port 51 and the pump port 42 are constantly communicated in the strokes of the servo piston 31.

In addition, the servo piston 31 is provided with a return port 52 that intercommunicates the center hole 34 and the drain port 43 of the housing 33 to return the pressure oil in the center hole 34 to a tank. An outer side of the return port 52 is opened in a groove formed on an outer circumference of the servo piston 31, so that the return port 52 and the drain port 43 are also constantly communicated in the strokes of the servo piston 31. Also, in the embodiment, since the connecting section 39 of the servo piston 31 and the driveshaft 21 is provided at a position opposite to the return port 52, the connecting section 39 is displaced downward in the axial direction relative to the pressure port 51.

As shown in FIG. 5 by dotted lines, the servo piston 31 is further provided with a first piston port 53 for intercommunicating the center hole 34 and the upper first hydraulic chamber 47 and a second piston port 54 for intercommunicating the center hole 34 and the lower second hydraulic chamber 48. Here, the opening of the first piston port 53 adjacent to the center hole 34 is positioned more downward than the opening of the pressure port 51, and the opening of the second piston port 54 adjacent to the center hole 34 is positioned more upward than the opening of the pressure port 51. The first and second piston ports 53 and 54 are each displaced so as not to communicate with the pressure port 51 or the return port 52.

An abutment member 55 is screwed with the servo piston 31 via an O-ring 104 to hermetically close the lower side of the center hole 34. The servo piston 31 abuts to the cover 38 via the abutment member 55, and abutment position serves as the lowermost position of the servo piston 31. A coil spring 56 is disposed between the cover 38 and the abutment member 55 within the second hydraulic chamber 48 to assist an upward movement of the servo piston 31. Even if the pressure oil in piping to the hydraulic servo drive device 30 is lost due to, e.g., a trouble of the pressure elevation pump 92, spring force of the coil spring 56 keeps the nozzle opening degree of the variable geometry turbocharger 1 at a rather opened state (preferably at a fully opened state).

The pilot spool 36 includes two spool lands, i.e., first and second spool lands 61 and 62 (switch of the invention) at a substantially central portion thereof. A return flow path 63 opened downward is provided to an inside of the pilot spool 36. An upper groove of the first spool land 61 and the return flow path 63 are communicated while a lower groove of the second spool land 62 and the return flow path 63 are also communicated. In addition, since the lower side of the return flow path 63 is opened, this return flow path 63, the return port 52, and the drain port 43 are communicated.

The pilot spool 36 is vertically slidable in the center hole 34 of the servo piston 31 through the tubular portion 45 of the partition 44, and an upper end of the pilot spool 36 is screwed and fixed to a holder 64 disposed within the pilot hydraulic chamber 46. The holder 64 is biased upward by a coil spring 65 in the pilot hydraulic chamber 46. The pilot spool 36 is moved downward by pilot pressure resisting the biasing force of the coil spring 65 and upward by the biasing force of the coil spring 65 with return of the pilot pressure oil (drained to an oil pan 80 adjacent to the solenoid valve 95 though the drain flow path is not shown).

In the hydraulic servo drive device 30 having such an arrangement, when the pilot spool 36 is elevated relative to the servo piston 31, the servo piston 31 follows the elevation, and when the pilot spool 36 is lowered, the servo piston 31 follows the lowering movement. Here, since the pilot spool 36 only slides axially in the servo piston 31, drive load at the time of advancement and retreat of the movable ring 15 is applied on the servo piston 31 via the slide mechanism 20 but not at all on the pilot spool 36.

Accordingly, when position of the pilot spool 36 is controlled for position control of the servo piston 31 and further for advancing and retreating the movable ring 15 to change the opening area of the nozzle 11, the position control of the pilot spool 36 can be conducted without being influenced by the drive load, so that load drift can be eliminated. Thus, even when fluid pressure deriving from exhaust gas is unstable in a turbocharger, that is, even in a case of the variable geometry turbocharger 1 of the embodiment, the opening area of the nozzle 11 can be easily controlled for precise control of emission. In addition, because position control can be precisely conducted, control format may be changed from the feedback control to the feedforward control to reduce response time and to handle transients with accuracy.

Next, operation of the hydraulic servo drive device 30 will be specifically described with reference to FIGS. 5 to 7. In FIG. 5, because the pilot pressure that overcomes the biasing force of the coil spring 65 is supplied, both the pilot spool 36 and the servo piston 31 are at a lowermost position. Thus, in this state, a lower end of the pilot spool 36 abuts to an upper end of the abutment member 55, and a lower end of the abutment member 55 abuts to the cover 38. Further, at this position, the upper spool land 61 of the pilot spool 36 is displaced downward relative to the second piston port 54; the second piston port 54 is communicated with the return port 52 through the return flow path 63; and the pressure oil in the second hydraulic chamber 48 is drained.

On the other hand, the lower second spool land 62 is also displaced downward relative to the first piston port 53, and the pressure port 51 and the first piston port 53 are communicated. Accordingly, the pressure oil is supplied to the first hydraulic chamber 47 through the pressure port 51 and the first piston port 53.

Incidentally, a portion of the pressure oil supplied to the pilot hydraulic chamber 46 passes through a slight gap formed between the tubular portion 45 of the partition 44 and the holder 64 or a slight gap formed between the tubular portion 45 and an outer circumference of an upper end of the pilot spool 36, and enters a space defined therebelow, that is, a space defined by an inner circumference of the center hole 34 of the servo piston 31, an outer circumference of the pilot spool 36, and a lower end of the tubular portion 45.

Figure 6:
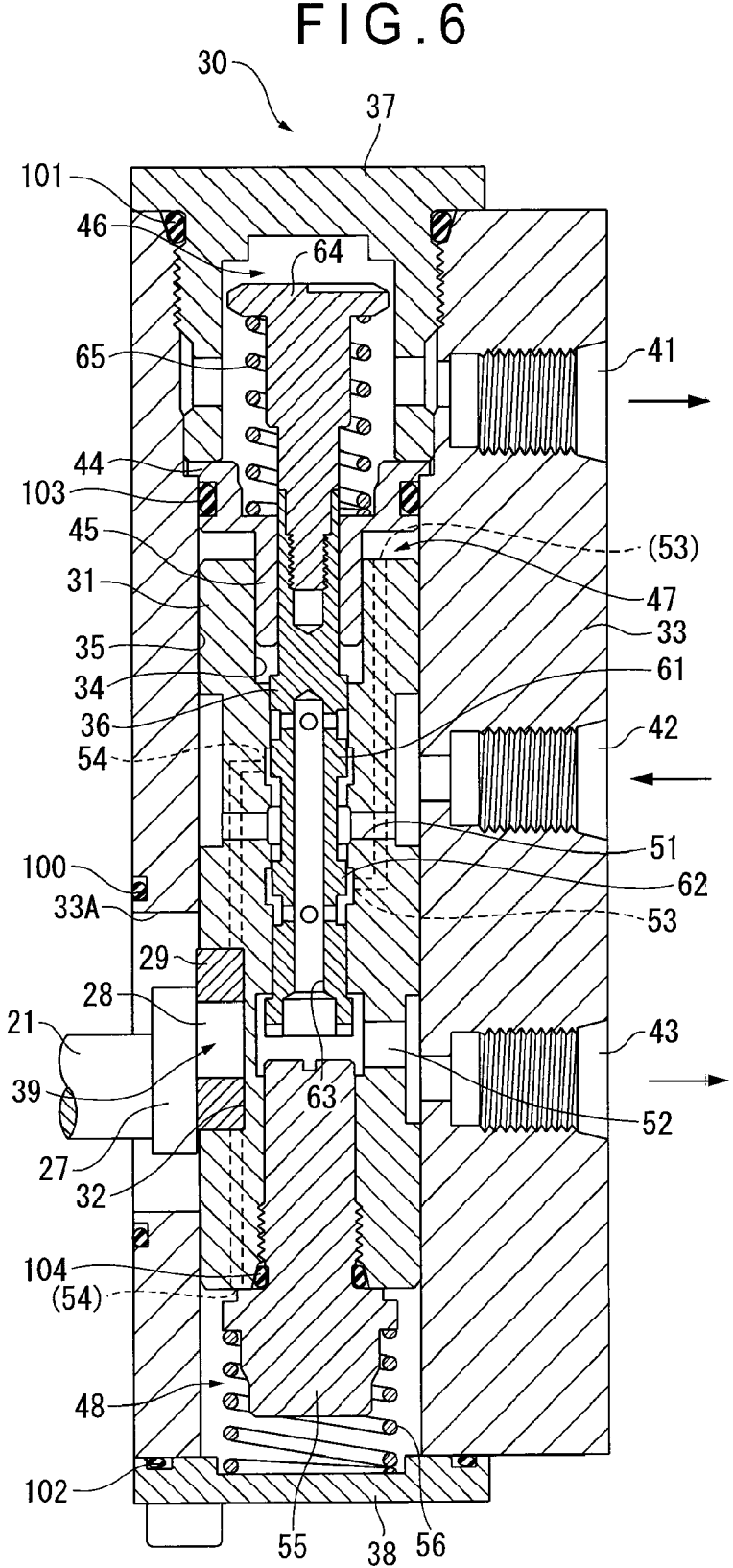
FIG. 6 is a cross-sectional view for explaining movement of the hydraulic servo drive device.

When the pilot pressure is lowered from this state to a predetermined value by returning the pressure oil of the pilot hydraulic chamber 46 as shown in FIG. 6, the pilot spool 36 is elevated to a position where the pilot pressure is balanced with the force of the coil spring 65. At this time, the upper first spool land 61 is displaced to an upper side of the second piston port 54, so that the second piston port 54 and the pressure port 51 become communicated to supply the pressure oil to the second hydraulic chamber 48.

At the same time, because the lower second spool land 62 is also displaced to an upper side of the first piston port 53, the first piston port 53 and the return flow path 63 become communicated, and a portion of the pressure oil in the first hydraulic chamber 47 is drained, so that the servo piston 31 follows the elevation of the pilot spool 36. This elevation of the servo piston 31 ends when the first and second piston ports 53 and 54 are closed by the first and second spool lands 61 and 62, and the servo piston 31 pauses at a position corresponding to the position where the pilot spool 36 pauses. The servo piston 31 does not go past the pilot spool 36 during the elevation.

Figure 7:
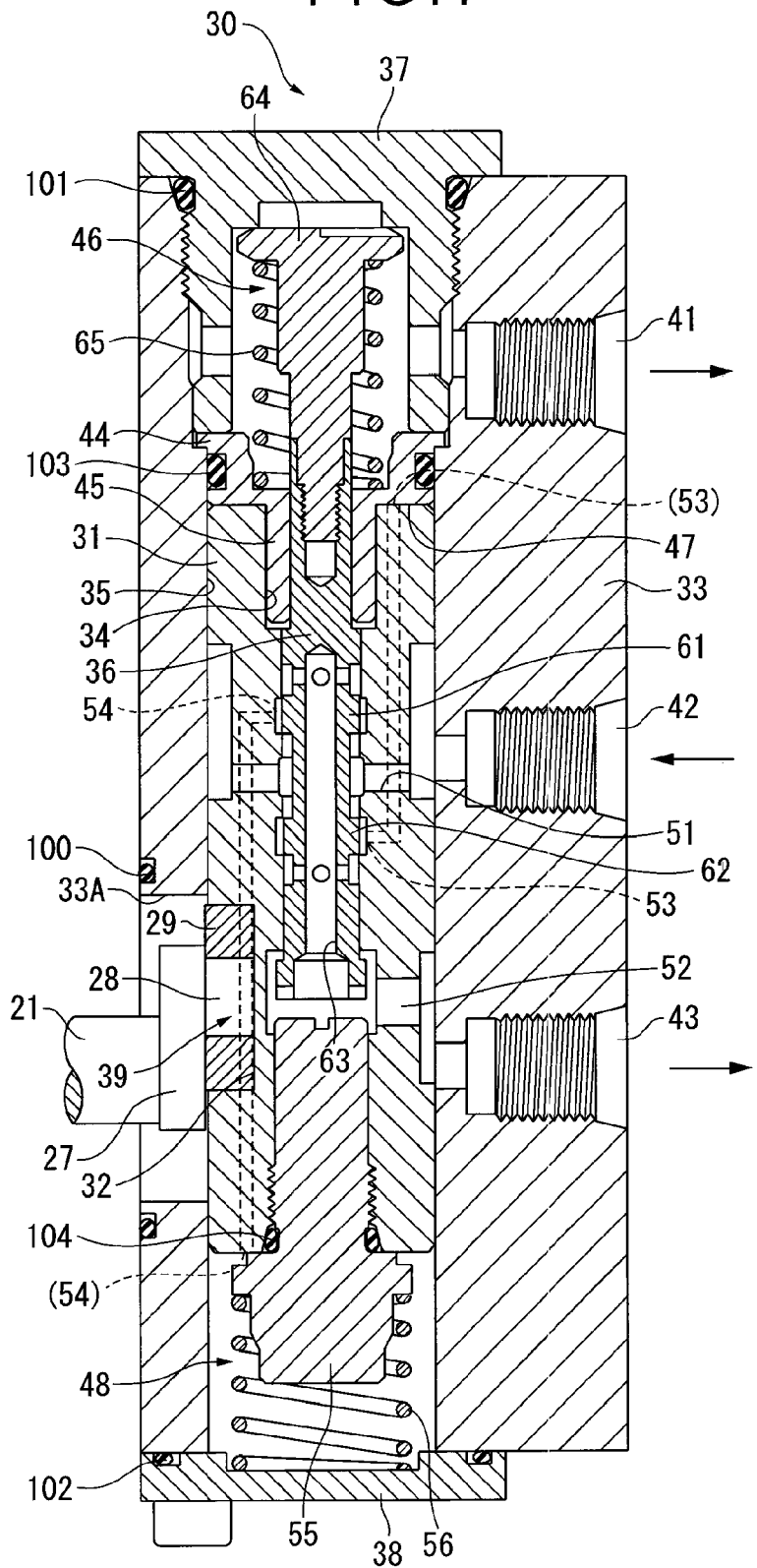
FIG. 7 is another cross-sectional view for explaining the movement of the hydraulic servo drive device.

Next, as shown in FIG. 7, when the pilot pressure is completely released, the pilot spool 36 moves upward to a position where an upper end of the holder 64 abuts to a ceiling of the pilot hydraulic chamber 46, and the servo piston 31 following this movement elevates until the upper end thereof abuts to the partition 44. At this time, the pilot spool 36 and the servo piston 31 are both at an uppermost position, and the first and second piston ports 53 and 54 are respectively closed by the first and second spool lands 61 and 62 with the second hydraulic chamber 48 full of the pressure oil.

Here, the pressure oil that has entered the space defined by the inner circumference of the center hole 34 of the servo piston 31, the outer circumference of the pilot spool 36, and the lower end of the tubular portion 45 returns to the pilot hydraulic chamber 46 through the above-mentioned gap.

When the servo piston 31 is to be lowered to a predetermined position, the pilot pressure is supplied to lower the pilot spool 36 to a predetermined position. With this operation, the second piston port 54 is again communicated with the return flow path 63 to drain a portion of the pressure oil of the second hydraulic chamber 48, thus lowering the servo piston 31. This lowering movement ends when the first and second piston ports 53 and 54 are closed by the first and second spool lands 61 and 62, and the servo piston 31 pauses at a position corresponding to the position where the pilot spool 36 pauses. The servo piston 31 does not go past the pilot spool 36 during the lowering movement.

With the hydraulic servo drive device 30 which operates as described above, the servo piston 31 and the pilot spool 36 function as a four-port valve of the triple position type, so that both the upward movement and the downward movement of the servo piston 31 can be conducted by supply of the pressure oil to one of the first and second hydraulic chambers 47 and 48 and drain of the pressure oil from the other occurring simultaneously with the supply. Thus, the hysteresis characteristic can be greatly improved as compared with the conventional open control of the spring balance type. Accordingly, because the load drift does not occur and the hysteresis characteristic is favorable, adjustment of the opening degree of the nozzle 11 can be precisely conducted. Further, because the pilot spool 36 operates not by solenoid thrust but by pilot pressure, unlike Patent Document 2, the pilot spool 36 is not affected by the flow force of the pressure oil, thereby achieving more precise position control of the pilot spool 36.

In addition, the pilot spool 36 for switching the supply of the pressure oil to the first and second hydraulic chambers 47 and 48 also has a function that corresponds to the spool of the solenoid valve of Patent Document 2. The arrangement where this pilot spool 36 slides within the servo piston 31 contributes to downsizing of the hydraulic servo drive device 30, thereby preventing enlargement of the variable geometry turbocharger 1. Moreover, although the embodiment requires such a solenoid valve as in Patent Document 2 for supplying pilot pressure, such a solenoid valve can be disposed at any suitable position apart from the variable geometry turbocharger 1 to lessen heat influence, so that a malfunction at the solenoid valve can be prevented, thus enhancing reliability.

Figure 8:
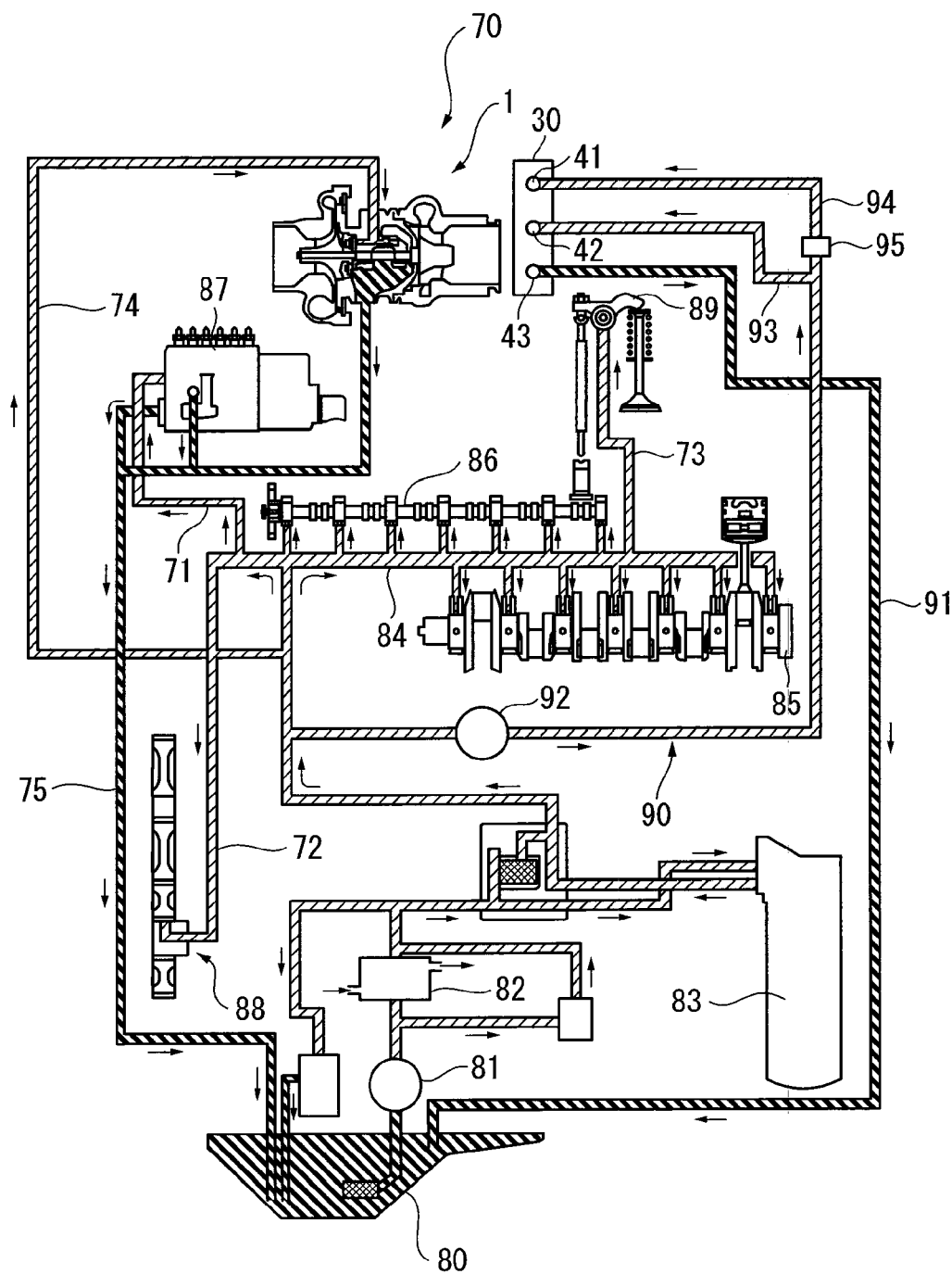
FIG. 8 is a schematic view showing a lubrication circuit of an engine.
Figure 9:
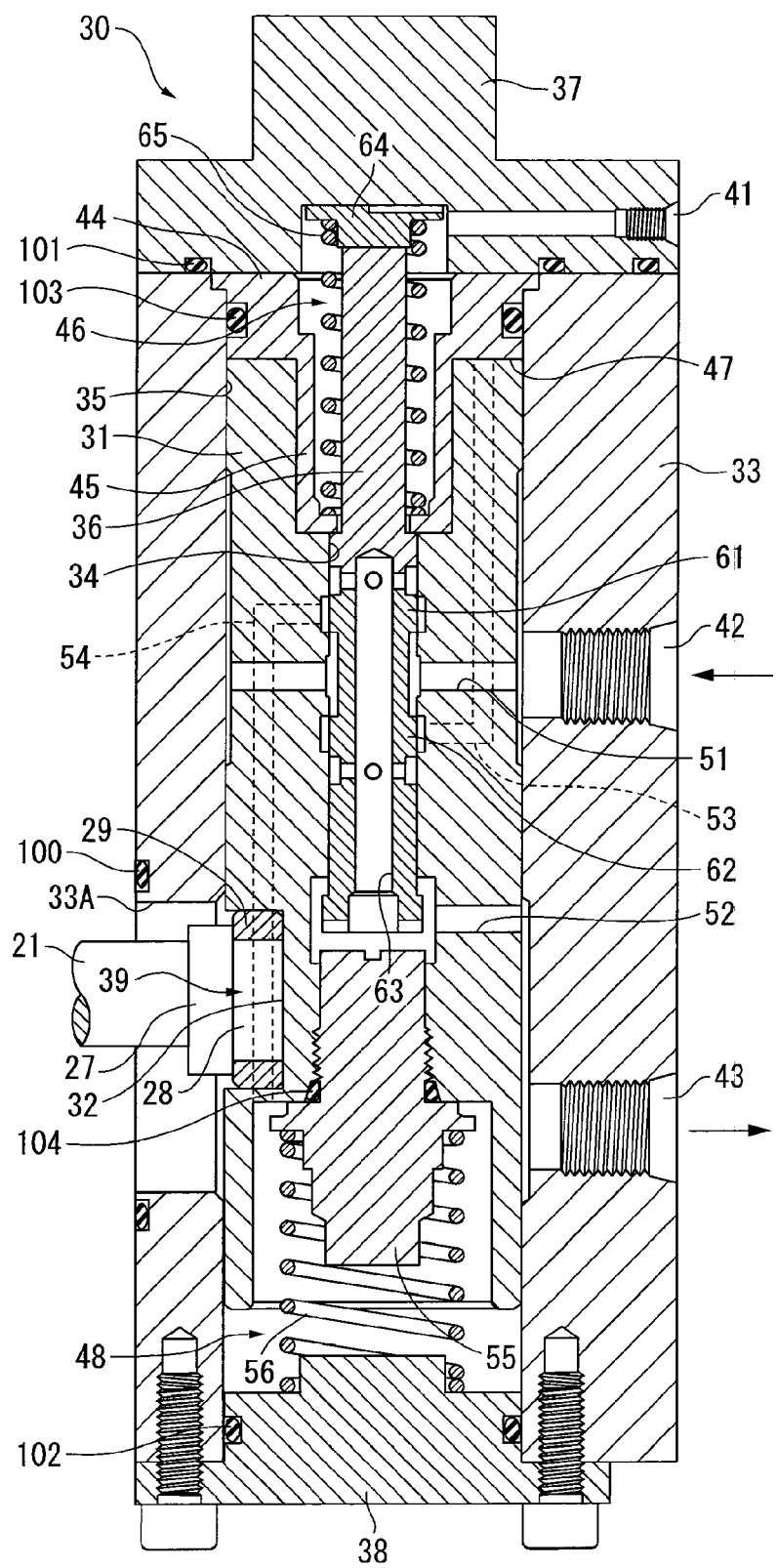
FIG. 9 is a cross-sectional view showing a modification of the invention.

FIG. 8 schematically shows a lubrication circuit 70 of an engine in which the variable geometry turbocharger 1 of the embodiment is installed. In the lubrication circuit 70, the lubricating oil in the oil pan 80 is pumped up by a hydraulic pump 81 and supplied to a main gallery 84 via an oil cooler 82 and an oil filter 83. The lubricating oil from the main gallery 84 mainly lubricates a crankshaft 85 and a camshaft 86.

The lubrication circuit 70 includes the following paths that are branched from the main gallery 84: an injector-side path 71 for lubricating a cam driver or the like in a fuel injector 87; a transmission-mechanism-side path 72 for lubricating a power transmission mechanism 88 that includes a timing gear; a rocker-arm-side path 73 for lubricating a rocker arm 89; a turbocharger-side path 74 for lubricating a bearing portion that supports the shaft 6 of the variable geometry turbocharger 1; and a first drain path 75 for returning the lubricating oil from the variable geometry turbocharger 1 and the fuel injector 87 to the oil pan 80. In addition, in the embodiment, a pressure oil supply path 90 for supplying a portion of the lubricating oil to the hydraulic servo drive device 30 as the driving pressure oil and a second drain path 91 for returning the pressure oil to the oil pan 80 from the drain port 43 of the hydraulic servo drive device 30 are provided separately from the lubrication circuit 70.

In other words, in the embodiment where the pressure oil for driving the hydraulic servo drive device 30 is fed by a portion of an engine lubricating oil, the path for supplying the pressure oil is the pressure oil supply path 90 branched before the main gallery 84. The pressure elevation pump 92 is provided adjacent to a base end of the pressure oil supply path 90, and the pressurized pressure oil is supplied to the pump port 42 of the hydraulic servo drive device 30 through a driving pressure path 93 adjacent to a distal end of the pressure oil supply path 90. A discharge pressure of the hydraulic pump 81 is approximately in the range of 196 to 294 kN/m$^2$ (2 to 3 kg/cm$^2$), and a discharge pressure after pressurization by the pressure elevation pump 92 is approximately 1470 kN/m$^2$ (15 kg/cm$^2$). Here, the distal end of the pressure oil supply path 90 is branched into the driving pressure path 93 for supplying the pump port 42 and a pilot pressure path 94 for supplying pilot pressure to the pilot port 41 of the hydraulic servo drive device 30, and thus, the pilot pressure path 94 is provided with the proportional solenoid valve 95 for generating the pilot pressure. By applying a predetermined electric current to the solenoid valve 95, pilot pressure in the range of 0 to 1470 kN/m$^2$ (0 to 15 kg/cm$^2$) corresponding to the electric current can be generated to move the pilot spool 36 to a position corresponding to the pilot pressure.

Incidentally, although the best arrangement, method, and the like for carrying out the invention have been described above, the scope of the invention is not limited thereto. In other words, although a particular embodiment of the invention is mainly illustrated and described, a variety of modifications may be made by those skilled in the art on shapes, amounts, and other detailed arrangements of the embodiment set forth above without departing from the scope of the inventive idea and the object of the invention.

Accordingly, the above description limiting shapes, amounts and the like is exemplary description for facilitating understanding of the invention and does not limit the scope of the invention, so that description with names of members without all of or a portion of the limitations such as limitations on shapes or amounts are included in the scope of the invention.

With this structure, since the hydraulic chambers 46 and 47 are aligned with each other, and an axial dimension of the housing 33 can be reduced, thereby further facilitating downsizing of the hydraulic servo drive device 30.

The invention can be utilized as a variable geometry turbocharger, e.g., for a construction machine that has a narrow engine room and is typically equipped with a hydraulic pump.

The invention claimed is:

1. A variable geometry turbocharger, comprising:
   exhaust inlet walls provided at a nozzle at an outer side of a turbine wheel and facing each other;
   a plurality of nozzle vanes disposed between the exhaust inlet walls with a predetermined interval along a circumferential direction of the turbine wheel;
   a slide mechanism that advances and retreats one of the exhaust inlet walls in a facing direction relative to the other of the exhaust inlet walls; and
   a hydraulic servo drive device that drives the slide mechanism,
   wherein:
   the hydraulic servo drive device includes a housing that has an opening at a portion thereof, a servo piston slidably housed in the housing and connected to the slide mechanism via the opening, and a pilot spool that is housed in a center hole of the servo piston and slides by pilot pressure,
   the housing includes a first hydraulic chamber at a first end of the servo piston and a second hydraulic chamber at a second end of the servo piston, pressure oil being flown into and out of the first hydraulic chamber and the second hydraulic chamber,
   the servo piston separately includes a pressure port for introducing the pressure oil from an outside into the center hole, a first piston port for intercommunicating the center hole and the first hydraulic chamber, a second piston port for intercommunicating the center hole and the second hydraulic chamber, and a return port for flowing out the pressure oil of the first and second hydraulic chambers to the outside,
   the pilot spool includes a switch that switches an intercommunicating state of the ports,
   the slide mechanism includes a first converter that converts rotary movement of a rotatable driveshaft into advancing and retreating movement of the one of the exhaust inlet walls,
   the driveshaft and the servo piston are connected via a second converter that converts the advancing and retreating movement of the servo piston into rotary movement of the driveshaft, and
   the second converter includes a slide groove formed perpendicular to the axial direction on an outer circumference of the servo piston, a slider that slidably engages in the slide groove, and an arm having a first end rotatable engaged to the slider and a second end connected to the driveshaft.

2. The variable geometry turbocharger according to claim 1, wherein:
   a pilot hydraulic chamber is provided adjacent to the first end of the servo piston in the housing and partitioned from the first hydraulic chamber by a partition, and
   the pilot hydraulic chamber is displaced outward in an axial direction of the housing relative to the first hydraulic chamber.

3. The variable geometry turbocharger according to claim 1, wherein:
   a pilot hydraulic chamber is provided adjacent to the first end of the servo piston in the housing and partitioned from the first hydraulic chamber by a partition, and
   the pilot hydraulic chamber is displaced inward in a radial direction of the housing relative to the first hydraulic chamber.

4. The variable geometry turbocharger according to claim 1, wherein the servo piston includes a connecting section for connection with the slide mechanism at a position displaced in an axial direction relative to the pressure port.

5. The variable geometry turbocharger according to claim 1, wherein at least one of the first and second hydraulic chambers is provided with a coil spring that biases the servo piston to one of moving directions of the servo piston.

6. The variable geometry turbocharger according to claim 1, wherein oil for driving the hydraulic servo drive device comprises lubricating oil of an engine in which the variable geometry turbocharger is installed.

7. The variable geometry turbocharger according to claim 6, wherein the lubricating oil is pressurized and supplied to the hydraulic servo drive device.

8. A driving method of the variable geometry turbocharger according to claim 1, the method comprising:
   communicating the pressure port with the first piston port and the second piston port with the return port by sliding of the pilot spool in a first direction due to an increase in pilot pressure, thereby causing the servo piston to follow the sliding of the pilot spool in the first direction;
   communicating the pressure port with the second piston port and the first piston port with the return port by sliding of the pilot spool in a second direction due to a decrease in the pilot pressure, thereby causing the servo piston to follow the sliding of the pilot spool in the second direction; and
   advancing and retreating the one of the exhaust inlet walls by driving the slide mechanism with sliding of the servo piston.

* * * * *